(12) United States Patent
Brannan

(10) Patent No.: US 7,966,941 B1
(45) Date of Patent: Jun. 28, 2011

(54) RIDER CONTROLLED ZIP LINE TROLLEY BRAKE

(76) Inventor: Kenton Michael Brannan, Rapid City, SD (US)

( * ) Notice: Subject to any disclaimer, the term of this patent is extended or adjusted under 35 U.S.C. 154(b) by 0 days.

(21) Appl. No.: 12/839,654

(22) Filed: Jul. 20, 2010

(51) Int. Cl.
*B61B 7/00* (2006.01)

(52) U.S. Cl. .......... 104/113; 104/112; 104/115; 104/53; 105/148; 105/150; 105/26.1; 472/122; 472/123; 472/45

(58) Field of Classification Search .................. 104/112, 104/113, 115, 53; 105/148, 150, 6.1, 26.1; 472/122, 123, 45
See application file for complete search history.

(56) References Cited

U.S. PATENT DOCUMENTS

| | | | | |
|---|---|---|---|---|
| 301,923 | A | | 7/1884 | Reisdorff |
| 547,528 | A | * | 10/1895 | Weaver et al. ................... 105/91 |
| 575,528 | A | * | 1/1897 | Weaver et al. ................... 104/87 |
| 599,697 | A | * | 3/1898 | Foster ............................. 105/91 |
| 1,087,062 | A | * | 2/1914 | Izett ............................. 104/115 |
| 1,087,063 | A | * | 2/1914 | Izett ............................. 104/115 |
| 1,206,581 | A | * | 11/1916 | Opsal ............................ 104/115 |
| 1,935,711 | A | | 11/1933 | Hecox et al. |
| 3,192,872 | A | * | 7/1965 | Parent ............................ 104/93 |
| 4,442,918 | A | | 4/1984 | Rhoads, Sr. |
| 4,934,277 | A | | 6/1990 | Smith et al. |
| 4,948,118 | A | * | 8/1990 | Miraglia ........................ 482/55 |
| 5,094,171 | A | * | 3/1992 | Fujita ........................... 104/115 |
| 5,113,768 | A | * | 5/1992 | Brown .......................... 104/112 |
| 5,224,426 | A | * | 7/1993 | Rodnunsky et al. .......... 104/112 |
| 5,378,214 | A | * | 1/1995 | Kreitenberg ................... 482/57 |
| 5,904,638 | A | * | 5/1999 | Habing et al. ................. 482/57 |
| 5,931,100 | A | * | 8/1999 | Sutton et al. .................. 104/53 |
| 6,622,634 | B2 | | 9/2003 | Cylvick |
| 6,666,773 | B1 | * | 12/2003 | Richardson ................... 472/49 |
| 7,381,137 | B2 | * | 6/2008 | Steele et al. .................. 472/45 |
| 7,404,360 | B2 | | 7/2008 | Cylvick |
| 7,637,213 | B2 | | 12/2009 | Cylvick |
| 2002/0162477 | A1 | | 11/2002 | Palumbo |
| 2006/0027134 | A1 | * | 2/2006 | Steele et al. ................. 104/113 |
| 2008/0202375 | A1 | * | 8/2008 | Quattlebaum ............... 104/112 |
| 2009/0049946 | A1 | * | 2/2009 | Buckman ..................... 74/502.2 |
| 2009/0223406 | A1 | * | 9/2009 | Smith .......................... 104/112 |
| 2009/0255436 | A1 | * | 10/2009 | Buckman ................... 104/117.1 |
| 2009/0266267 | A1 | * | 10/2009 | Moss ............................ 104/53 |

* cited by examiner

*Primary Examiner* — S. Joseph Morano
*Assistant Examiner* — Jason C Smith

(57) ABSTRACT

An improved zip line trolley allowing a rider control of his or her speed while traversing along a suspended cable (8) as seen in FIGS. 1A and 1B. The trolley comprises front and rear pulleys (44F) and (44R) conjoined via pulley housing (16) with left and right horizontal handles (10L) and (10R) attached to vertical shaft (12). Front and rear hand brake levers (20F) and (20R) are mounted onto left and right horizontal handles (10L) and (10R). When front and rear hand brake levers (20F) and (20R) are squeezed by the rider, they create a constricting force on front left and right calipers (32FL) and (32FR) along with rear left and right calipers (32RL) and (32RR) of FIGS. 2A and 3A. Thus, friction is applied to front and rear pulleys (44F) and (44R) via front left and right brake pads (34FL) and (34FR) along with rear left and right brake pads (34RL) and (34RR). This frictional force slows the rider's speed to his or her desired rate and brings the rider to a safe stop at a precise location along suspended cable (8).

4 Claims, 11 Drawing Sheets

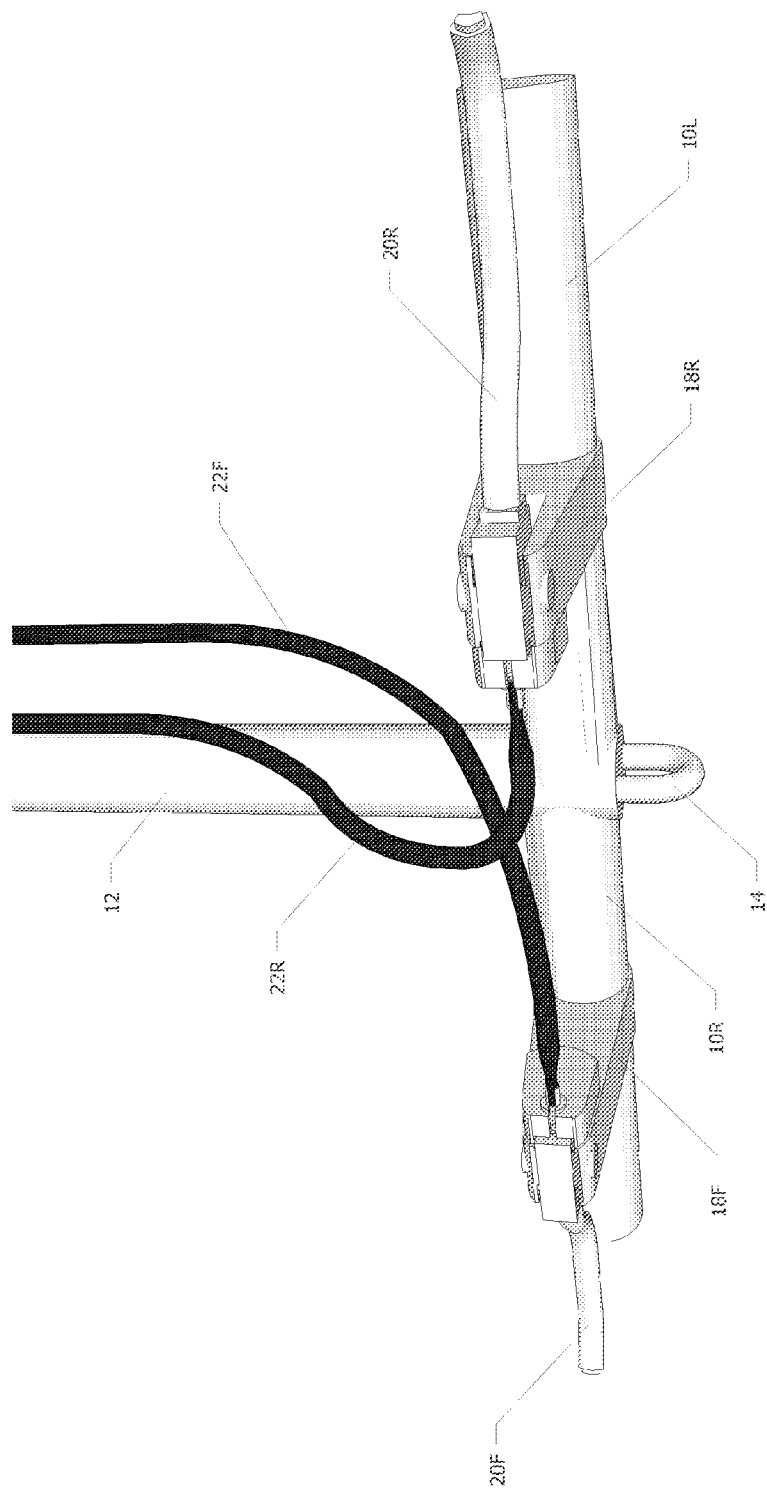

RIDER CONTROLLED ZIP LINE TROLLEY BRAKE

CROSS-REFERENCE TO RELATED APPLICATIONS

Not Applicable

FEDERALLY SPONSORED RESEARCH

Not Applicable

REFERENCE TO SEQUENCE LISTING

Not Applicable

BACKGROUND

1. Field

This application relates to suspended cable transport systems commonly known as zip lines. More specifically, this application relates to trolleys for zip line or other suspended cable systems which allow riders to maintain control of their speed of descent while traversing along a suspended cable.

2. Prior Art

Common zip lines are thrill-ride systems which are predominantly applied to applications for amusement. A common zip line system includes a suspended cable (constructed of aluminum, steel or similar metallic material) stretched between, and rigidly affixed to, separate supporting structures. One end of the suspended cable is affixed to a support structure which is located at an elevation higher than that of the opposite end. The result is a downward slope of the suspended cable. The higher end of the suspended cable is referred to as the beginning-end, and the lower end is referred to as the ending-end. A common zip line trolley consists of either one or two pulleys affixed to a common pulley housing. The pulleys of the trolley are placed on top of the suspended cable and a rider holds on to, or is tethered to, the trolley via a conventional safety harness. The downward slope of the suspended cable facilitates a gravitational force which propels the trolley and rider along the suspended cable.

A common zip line ride consists of a rider placing a common trolley on top of a suspended cable at the beginning-end. The rider either holds on to the trolley or is tethered to it via a safety harness. The ride begins when the rider disembarks from the beginning-end traversing along the suspended cable. The ride is complete upon the rider reaching the ending-end.

Zip lines are used by individuals at their own personal locations as well as by businesses in commercial applications. Many commercial zip line canopy tours employ the use of multiple suspended cables allowing for a variety of rides for patrons. Common trolleys are most often constructed of steel, or similar rigid material. Unfortunately, they do not afford a rider the ability to control his or her speed of descent while traversing along the suspended cable. Devices and systems similar to zip lines are witnessed within the oil industry relating to lowering endangered personnel from oil derrick towers.

Zip line riders can be classified as one of two types. Type one, commonly referred to as a novice or beginner, typically has minimal experience with zip lines and is apprehensive about riding one. Novices often prefer to traverse along the suspended cable at a relatively slow speed. Type two, commonly referred to as a daredevil, is an experienced zip line rider seeking the ultimate thrill, normally through traversing along the suspended cable at a rapid speed.

Various types of braking systems for common zip lines are known within the art. The most common methods of zip line braking systems presently available include gravity braking, impact braking and frictional braking. None of the braking systems presently available for common zip lines allow a rider control of his or her speed in a safe, economical and easy-to-use manner.

A gravity braking method relies on the natural sag in the suspended cable coupled with the rider's weight to bring he or she to a stop. The ride ends at a point where the rider's momentum ceases to propel the rider along the suspended cable. Most common zip lines designed with this braking method are only able to utilize roughly 70.0%-80.0% of the entire length of the suspended cable. Additionally, this method of bringing riders to a stop is imprecise and unpredictable in that riders of different weight will each develop a different momentum. As a result, each rider may stop at a different location along the suspended cable. This can complicate and add expense to the manner in which a zip line course designer designs the means for riders to disembark the suspended cable. An additional problem with this braking method is the rider has no control of his or her speed while traversing along the suspended cable. As a result, riders may accelerate to a velocity beyond their comfort level.

Impact braking methods commonly utilize an elastic cord (often a bungee cord or other similar material) along with a small block. The block is affixed close to the ending-end and in a manner such that it can slide freely along the suspended cable. One end of the bungee cord is fastened to the block and the other end is rigidly affixed to a point on the ground. When a rider traversing along the suspended cable makes contact with the block, the bungee cord expands and brings the rider to a stop. Riders can often be slowed to a stop at a rapid deceleration rate and then be snatched backwards along the suspended cable due to the springing function of the elastic cord. This is referred to as the "whip-lash effect" and is an undesirable and potentially unsafe function typical of such an impact braking method. Riders of different weight will each have a different momentum, thus causing the elastic cord to respond differently to each rider. Similar to gravity braking methods, impact braking methods are also unpredictable and often do not allow for full utilization of the length of the suspended cable. Furthermore, riders have no control of their velocity while traversing along the suspended cable.

In addition to elastic cords, rubber tires affixed to the ending-end of a suspended cable are often used as an impact braking method. Rubber tires witness similar results and potential safety hazards as those experienced with elastic cords.

Another method of impact braking includes a person standing on the ground near the ending-end of the suspended cable. This person, known as a brakeman, holds a rope or elastic cord which is attached to a block that can slide along the suspended cable. As the rider intercepts the block, the brakeman restricts the rope's motion, thus slowing the rider, often abruptly. This is another imprecise and unpredictable braking method which can be unsafe for both rider and brakeman. Furthermore, employment of a brakeman is an added expense to a commercial zip line system.

Frictional braking can be the most dangerous among the common zip line braking methods. One form of frictional braking requires the rider to wear a glove. While traversing along the suspended cable, the rider squeezes the suspended cable with the hand wearing the glove. This creates dynamic friction along the suspended cable, thus slowing the rider. This can be dangerous in that the rider can wear a hole through the glove and rub his or her skin along the suspended cable. Another form of frictional braking requires the rider to drag his or her feet along the ground while approaching the ending-end. Both of these methods are unpredictable and dangerous as bodily harm can easily be experienced.

Other braking methods known within the art add considerable expense and complexity to a common zip line. Many are rigidly fixed to a particular suspended cable, thus not easily transportable among other suspended cables. They often include a complicated series of additional pulleys and cables which all must work in unison to be operational. Should any one piece of such a braking system malfunction, the entire braking mechanism and rider's safety can be jeopardized. Additionally, some braking methods apply frictional forces directly to the suspended cable, similar to the frictional braking method of the rider using a glove as previously described. As dynamic friction is created, premature degradation and deformation of the suspended cable occurs. This can compromise the structural integrity of the suspended cable, thus making it prone to premature failure. This adds expense to a common zip line system by requiring earlier replacement of the suspended cable as well as creating a potentially unsafe situation for riders. Suspended cable zip line systems are dangerous in their nature wherein the rider's safety is dependent upon the structural integrity of both the trolley and the suspended cable.

With regards to common trolleys, most utilize a single point of connection between the trolley and the rider's safety harness. A typical safety harness is normally made of nylon or other safety fabric. A fabric harness, coupled with a single point of connection to the trolley, creates the likelihood that the rider's position will twist while traversing along the suspended cable. Often times the rider may be facing sideways or even backwards during the ride due to this twisting effect. This can pose a serious safety hazard since the rider's feet may no longer be facing forward. Common trolleys and safety harnesses allowing riders to twist can be especially dangerous for a zip line system which relies upon riders using their feet to facilitate braking. For these systems, it is imperative for riders to have both feet facing forward and be ready to land on both feet at the end of the ride.

U.S. Pat. Nos. 7,637,213 and 7,404,360 and US Patent Application Publication 20100162917 to Cylvick describe a trolley intended for use on a suspended cable or zip line. This trolley comprises a single pulley with a series of brake pad segments which apply dynamic frictional forces to the suspended cable. Although the braking mechanism on Cylvick's device calls for a material to be used which is not intended to prematurely degrade the suspended cable, undesirable dynamic frictional forces are indeed created. These frictional forces will accelerate wear and can result in a premature lifespan reduction of the suspended cable. One embodiment of Cylvick's device relies predominantly upon the weight of the rider for speed control. Once the rider's weight is determined, the trolley is adjusted accordingly prior to the rider embarking upon a ride. Another embodiment of Cylvick's device does allow for a rider to pull a tether while traversing along the suspended cable. This tether operates in conjunction with, and is dependent upon, the rider's weight. The rider pulls the tether which counteracts the effect of the rider's weight on the braking mechanism. Thus, a rider is able to achieve a minimal degree of speed control during the ride. Cylvick's braking mechanism on this trolley utilizes a series of brake pad segments to provide the frictional braking force which is applied to the suspended cable. Replacement of these brake pads can be difficult in that the entire brake assembly must be detached from the trolley and disassembled. Furthermore, this particular trolley can be cumbersome to remove from the suspended cable. It does not afford itself to quick and easy switching among different suspended cables. Lastly, since the brake pads will wear and form to particular cable diameters, this trolley cannot safely be interchanged among different suspended cables each having different diameters.

U.S. Pat. No. 6,622,634 to Cylvick describes a trolley intended for use on a suspended cable or zip line. This trolley comprises a single pulley with a brake pad which applies frictional forces to the suspended cable. This frictional force is undesirable in that it accelerates wear and can prematurely jeopardize the structural integrity of the suspended cable. Furthermore, the speed of descent for this device is predetermined and preset based upon the elevation difference between the support structures. Thus, riders of different weights will traverse along the suspended cable at approximately the same speed. However, riders have no control of their speed during the duration of the ride. The braking mechanism of this apparatus also employs a V-shaped trap which assists in applying additional dynamic friction directly to the suspended cable. This trolley can be complicated to remove from the suspended cable in that partial disassembly is required.

U.S. Pat. No. 6,666,773 to Richardson describes a zip line system which applies a frictional force to the suspended cable. The rider's speed of descent is predetermined based upon the rider's weight and does not afford speed control to the rider during the ride. The braking mechanism of this apparatus also employs a V-shaped trap which assists in applying additional dynamic friction directly to the suspended cable.

US Patent Application Publication 20090255436 to Buckman describes a zip line braking system utilizing a series of pulleys and ropes along with a counterweight to bring the rider to a stop. This braking method affords the rider no speed control while traversing along the suspended cable. The effectiveness of this braking mechanism will vary depending upon the weight of each rider. The desired braking adjustment is achieved by a guide applying a dynamic frictional force directly to a connecting member which is attached to the counterweight. The guide applies the frictional force to the connecting member by squeezing it through a pair of gloves which he or she is wearing. Common zip lines are not inexpensive to construct with the suspended cable often being the most expensive component. The apparatus described by Buckman requires utilization of two suspended cables of equal diameter and tensile strength, thus instantly doubling the expense for a common zip line. The necessary combination of steel pulleys and other connecting members also adds considerable expense. This braking system is rigidly fixed to a particular zip line and does not allow for quick and easy transport among different suspended cables. Lastly, an additional person, the guide, may be necessary to enhance the braking action which also adds to the complexity and expense of this braking method.

U.S. Pat. No. 7,381,137 to Steele et al. describes a zip line braking and motion arrest apparatus utilizing a braking block coupled with a series of pulleys along with braking and anti-rollback devices. This apparatus does not allow the rider any control of his or her speed. The pulleys, struts and crossbar described will add considerable expense to a common zip line. Also, this apparatus is rigidly fixed and not easily transportable among other suspended cables.

US Patent Application 20020162477 to Palumbo describes a braking system utilizing a series of cables, mechanical motor drive and a speed control mechanism. This speed control mechanism can be comprised of either an air shock, nitrogen shock, hydraulic disc brake or magnetic disc brake system. The infrastructure and expense required to construct and operate such an apparatus is far beyond the means of a common zip line enthusiast.

U.S. Pat. No. 4,934,277 to Smith et al. describes an apparatus designed for the safe recovery of individuals stranded upon suspended cables such as ski lifts. A brake shoe is applied directly to the suspended cable and the force applied is dependent upon the rescuer's weight and a predetermined adjustment of the described lever arm. This adjustment must be predetermined and applied prior to the rescuer descending along the suspended cable. The design of this apparatus affords itself to a slow-moving rescue device and not necessarily for a rapid moving recreational zip line trolley.

U.S. Pat. No. 5,094,171 to Fujita describes an apparatus for use in allowing an oil derrick operator to safely escape an oil drilling rig or derrick. The braking mechanism for this apparatus consists of a dynamic brake located on the front sheave and a shoe brake located within the rear sheave. The sheaves must be double grooved such that the suspended cable can be double or triple wound around the sheaves. The dynamic brake setting is predetermined and adjusted prior to descent along the suspended cable, thus limiting or possibly eliminating altogether the operator's control of his or her speed. Furthermore, since the suspended cable is double or triple wound around the sheaves, transporting this apparatus to another suspended cable cannot be quickly or easily accomplished.

U.S. Pat. No. 4,442,918 to Rhoads, Sr. describes an apparatus intended for allowing an endangered person to escape from an elevated structure. The braking system for this apparatus employs an automatic brake which controls the descent of a trolley along a suspended cable. The automatic brake is comprised of a fluid pump and a cable reel of non-uniform diameter. The intent of this apparatus is beyond the scope of a common zip line and would be cost prohibitive to apply to such a system.

U.S. Pat. No. 1,935,711 to Hecox et al. describes an oil derrick escape device. This apparatus allows the escapee speed control by applying a frictional force directly to the suspended cable. This device is not intended, or practical for use on a common zip line system.

U.S. Pat. No. 301,923 to Reisdorff describes a fire escape device used in conjunction with a suspended rope strung from the top of a burning building. The device utilizes a single pulley and the braking mechanism comprises two separate components. The first is a series of outwardly projecting spurs or barbs which embed into the rope to retard the speed of descent. The second is a lever which allows the escapee to apply a frictional force to the side of the pulley, thus further slowing the speed of descent. This device would not operate as intended if used in conjunction with a metallic suspended cable rather than a rope. The outwardly projecting spurs will not embed into a metallic suspended cable as they will with a rope. Thus, this speed-retarding feature cannot be realized on a common zip line system.

SUMMARY

In accordance with one embodiment, a zip line trolley is provided which affords a rider control of his or her speed while traversing along a suspended cable. As the rider descends along the suspended cable, he or she gently squeezes either or both of a pair of handbrakes. As a result, a dynamic frictional force is applied to the pulleys which slows and ultimately brings the rider to a gentle stop at a precise location.

DRAWINGS

Figures

The foregoing and other objects and features of the present trolley will become more fully apparent from the following description and appended claims, taken in conjunction with the accompanying drawings. Understanding that these drawings depict only typical embodiments of the trolley and are, therefore, not to be considered limiting of its scope, the trolley will be described with additional specificity and detail through use of the accompanying drawings in which:

FIG. 5 is a left-side, front-angle, close-up view of the handle assembly of FIG. 1B showing the hand-braking mechanism.

DRAWINGS

Reference Numerals

Figure 1A:
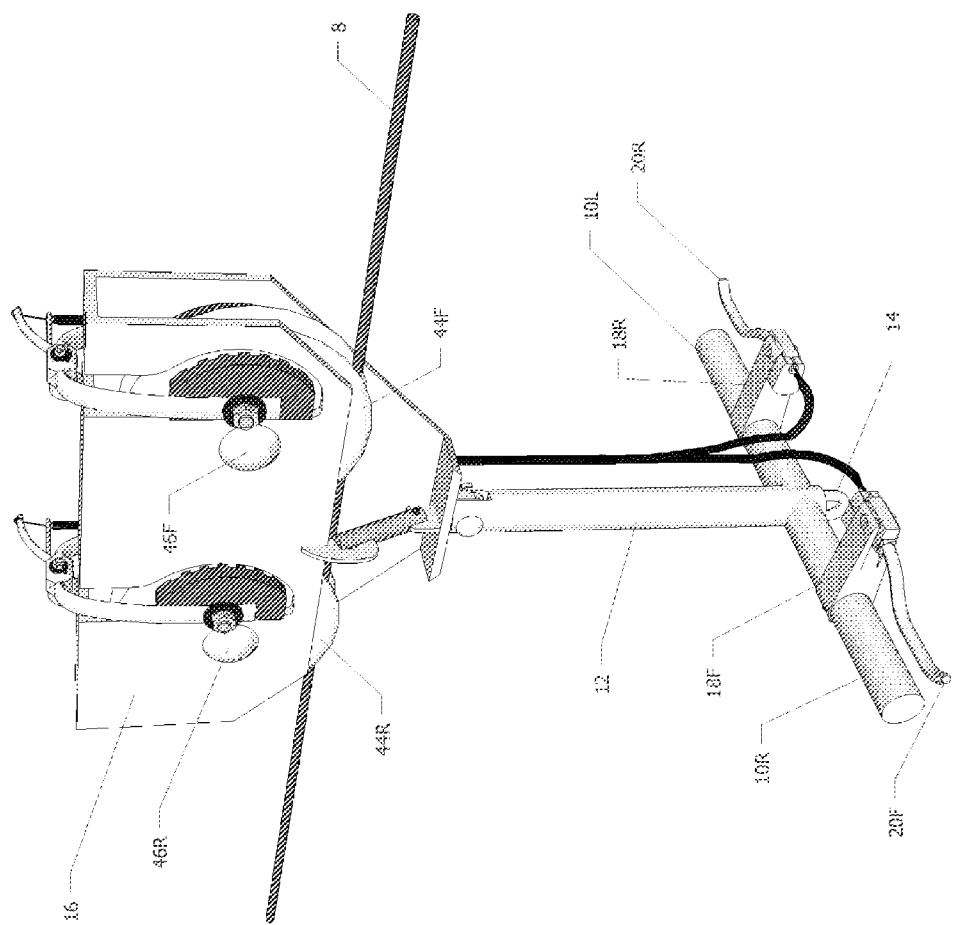
FIG. 1A is a right-side, front-angle view showing the entire trolley in accordance with one embodiment.

8—suspended cable
10L—left horizontal handle
10R—right horizontal handle
12—vertical shaft
14—harness loop
16—pulley housing
18F—front hand brake mounting bracket
18R—rear hand brake mounting bracket
20F—front hand brake lever
20R—rear hand brake lever
22F—front brake cable sleeve
22R—rear brake cable sleeve
24—vertical shaft mounting bracket
26—vertical shaft mounting pin
28—vertical shaft cotter pin
30F—front brake cable
30R—rear brake cable
32FL—front left caliper
32FR—front right caliper 32RL—rear left caliper
32RR—rear right caliper
34FL—front left brake pad
34FR—front right brake pad
34RL—rear left brake pad
34RR—rear right brake pad
36FL—front left brake pad nut
36FR—front right brake pad nut
36RL—rear left brake pad nut
36RR—rear right brake pad nut
38F—front brake mounting bracket
38R—rear brake mounting bracket
40F—front brake bolt
40R—rear brake bolt
42F—front brake bolt nut
42R—rear brake bolt nut
44F—front pulley
44R—rear pulley
46F—front pulley pin
46R—rear pulley pin
48—latch shaft
50—latch shaft mounting bracket
52—latch shaft seat
54—latch shaft hinge
56F—front brake cable nut
56R—rear brake cable nut

DETAILED DESCRIPTION

The trolley and associated braking mechanism will now be described with reference to the accompanying drawing figures. It is to be understood that the drawing FIGS. 1A through 6B are meant to be only illustrative, that they are not necessarily drawn to scale, and that some details, which would be obvious to those of ordinary skill in the art, may have been omitted in the interest of simplification and brevity.

Figure 1B:
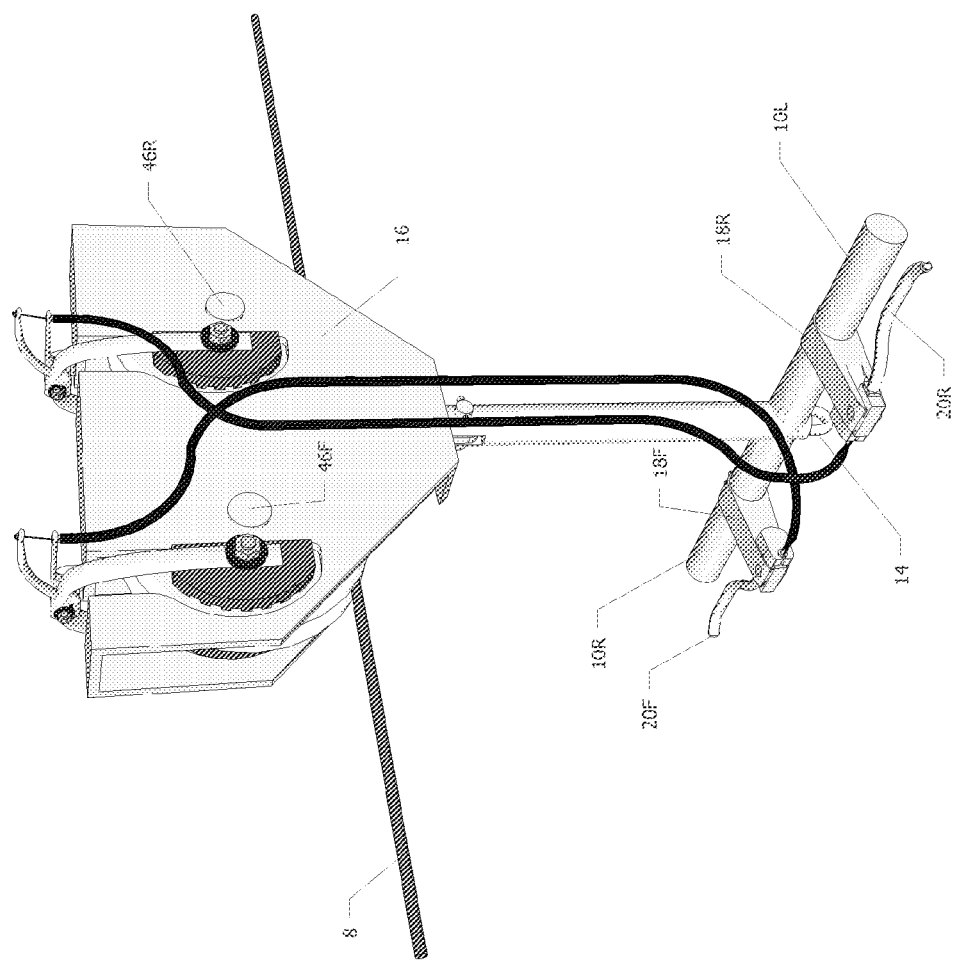
FIG. 1B is a left-side, front-angle view showing the entire trolley in accordance with one embodiment.

FIGS. 1A and 1B illustrate a complete view of the rider controlled zip line trolley brake. Both figures illustrate a suspended cable 8 indicative of a common zip line thrill-ride system. The trolley comprises a left horizontal handle 10L and a right horizontal handle 10R, which are attached horizontally to the bottom of a vertical shaft 12. A harness loop 14 is solidly connected to the bottom of vertical shaft 12. The top of vertical shaft 12 attaches to the base of pulley housing 16. A front hand brake lever 20F is connected to right horizontal handle 10R via a front hand brake mounting bracket 18F. A rear hand brake lever 20R is connected to left horizontal handle 10L via a rear hand brake mounting bracket 18R. A front pulley 44F is attached to pulley housing 16 via a front pulley pin 46F. A rear pulley 44R is attached to pulley housing 16 via a rear pulley pin 46R. While the rider controlled zip line trolley brake is in use, front and rear pulleys 44F and 44R rest atop suspended cable 8.

In the preferred embodiment, left and right horizontal handles 10L and 10R and vertical shaft 12 are constructed of tubular steel or other rigid pipe-like material and have a diameter of 2.54 cm (1.0 inch). Left and right horizontal handles 10L and 10R shall each be approximately 20.32 cm (8.0 inches) in length and vertical shaft 12 shall be approximately 25.4 cm (10.0 inches) in length. Harness loop 14 shall be approximately 2.54 cm (1.0 inch) tall by 2.54 cm (1.0 inch) wide and be constructed of tubular steel with a diameter of 0.64 cm (0.25 inch). Pulley housing 16 shall be constructed of plate steel approximately 3.175 mm (0.125 inch) thick and be approximately 20.32 cm (8.0 inches) long, 3.18 cm (1.25 inches) wide and 15.24 cm (6.0 inches) tall. Front and rear hand brake levers 20F and 20R are circular in shape and constructed of aluminum. Both shall be approximately 12.7 cm (5.0 inches) in length and 1.27 cm (0.5 inch) in diameter. Front and rear hand brake mounting brackets 18F and 18R shall also be constructed of aluminum and be of adequate size and shape to safely connect front and rear hand brake levers 20F and 20R to left and right horizontal handles 10L and 10R. Front and rear pulleys 44F and 44R shall be approximately 7.62 cm (3.0 inches) in diameter and 1.91 cm (0.75 inch) thick. Front and rear pulley pins 46F and 46R shall be of adequate size and shape to safely attach front and rear pulleys 44F and 44R to pulley housing 16. These particular items can have different sizes, thicknesses, etc., as well as cross sectional shapes, such as triangular, rectangular, etc. Furthermore, these particular items can also be constructed of other rigid materials such as titanium, aluminum, etc., safe for supporting a rider's weight.

Figure 2A:
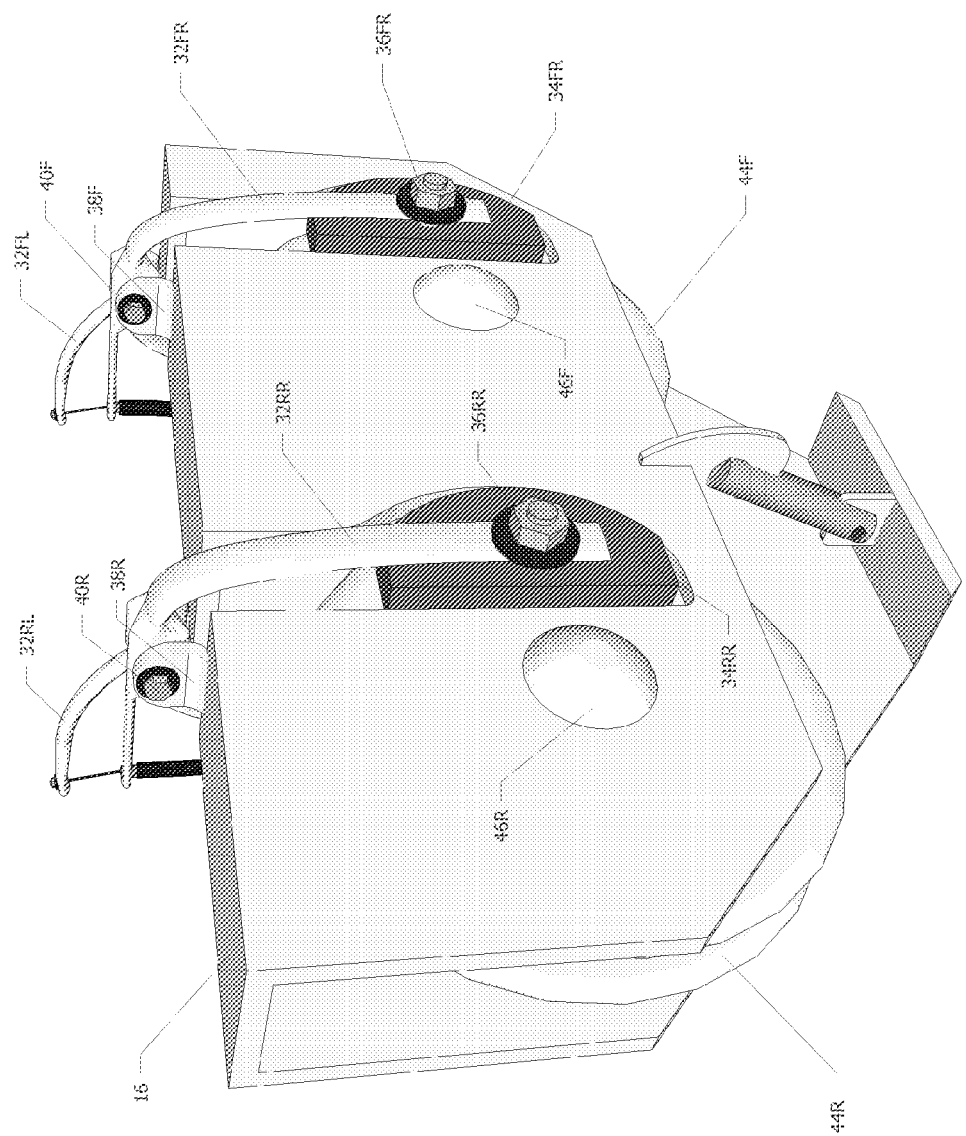
FIG. 2A is a right-side, rear-angle, close-up view of the pulley housing of FIG. 1A showing the braking mechanism, brake mounting brackets and latch assembly.
Figure 2B:
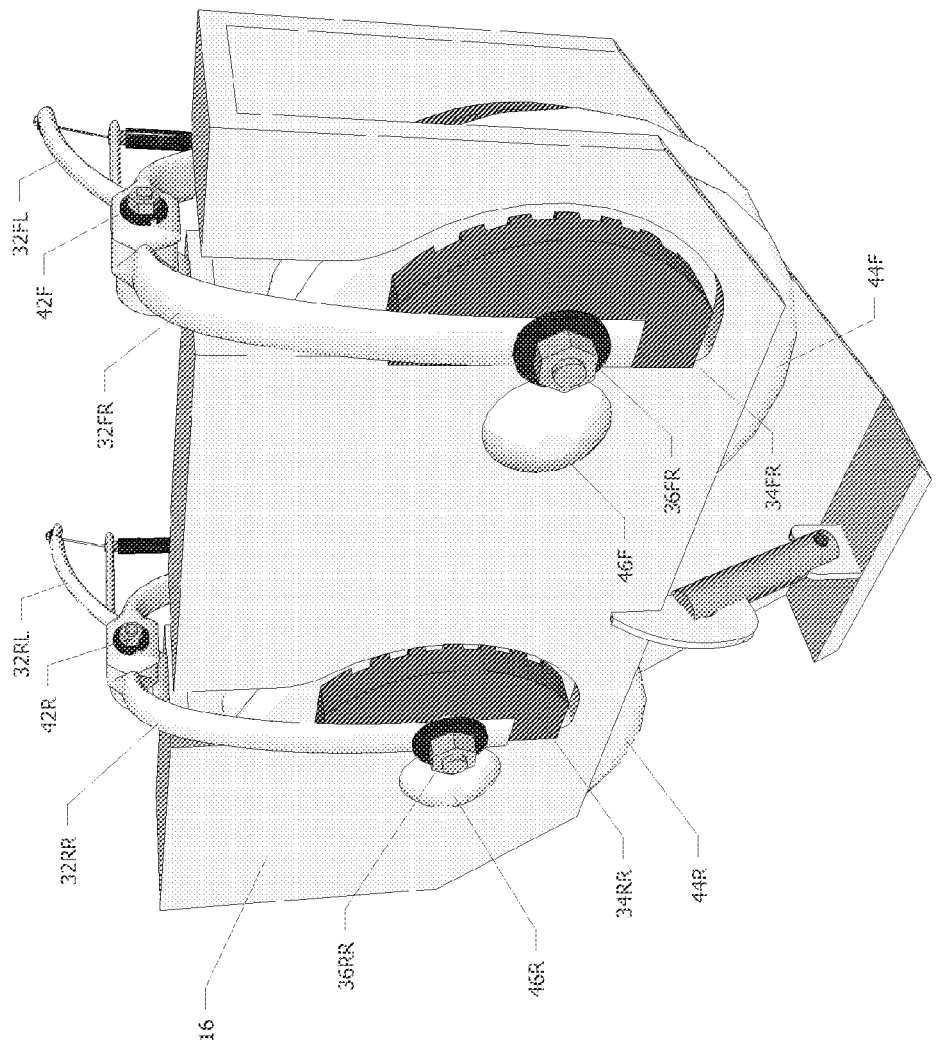
FIG. 2B is a right-side, front-angle, close-up view of the pulley housing of FIG. 1A showing the braking mechanism and latch assembly.

Referring to FIGS. 2A and 2B, a close up view of pulley housing 16 illustrates additional components. Front and rear pulleys 44F and 44R are attached to pulley housing 16 via front and rear pulley pins 46F and 46R. A front brake mounting bracket 38F and a rear brake mounting bracket 38R are rigidly affixed to the top of pulley housing 16. A front right caliper 32FR and a front left caliper 32FL are secured to front brake mounting bracket 38F via a front brake bolt 40F. A front brake bolt nut 42F is affixed to front brake bolt 40F and used to secure front left and right calipers 32FL and 32FR to front brake mounting bracket 38F. A front right brake pad 34FR is secured to front right caliper 32FR via a front right brake pad nut 36FR. A rear right caliper 32RR and a rear left caliper 32RL are secured to rear brake mounting bracket 38R via a rear brake bolt 40R. A rear brake bolt nut 42R is affixed to rear brake bolt 40R and used to secure rear left and right calipers 32RL and 32RR to rear brake mounting bracket 38R. A rear right brake pad 34RR is secured to rear right caliper 32RR via a rear right brake pad nut 36RR.

In the preferred embodiment, front and rear brake mounting brackets 38F and 38R are constructed of the same material chosen for pulley housing 16. Front left caliper 32FL, front right caliper 32FR, rear left caliper 32RL, rear right caliper 32RR, front right brake pad nut 36FR, rear right brake pad nut 36RR, front brake bolt 40F, front brake bolt nut 42F, rear brake bolt 40R and rear brake bolt nut 42R are constructed of steel. However, any or all of these items can also be constructed of titanium, aluminum or any other rigid material adequate for safe operation. These items shall also be sized appropriately for safe operation. Front right brake pad 34FR and rear right brake pad 34RR are constructed of a durable polymeric material, such as Teflon, nylon, high-density polyethylene (HDPE) or any other conventional brake material adequate for safe operation. Precise assembly of the components in FIGS. 2A and 2B is more clearly illustrated in the exploded views of FIGS. 6A and 6B.

Figure 3A:
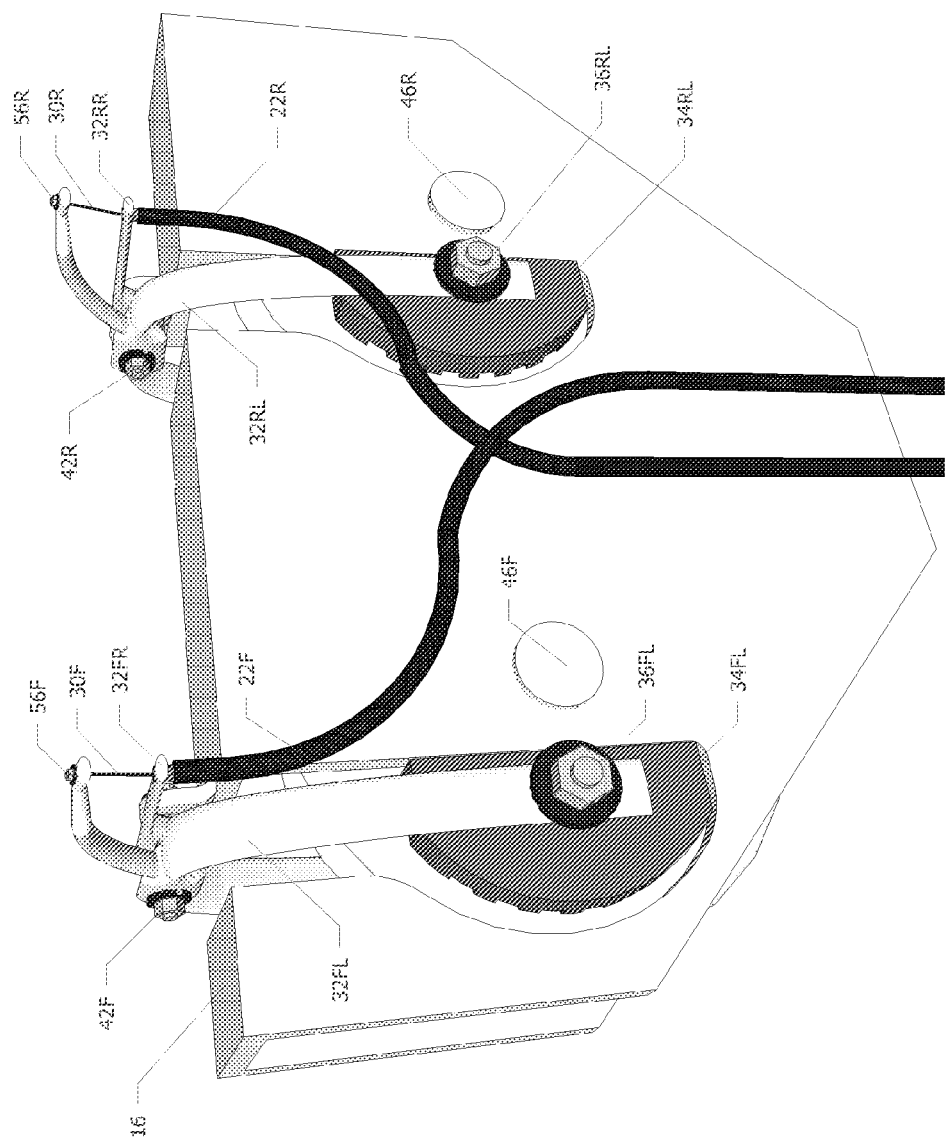
FIG. 3A is a left-side, front-angle, close-up view of the pulley housing of FIG. 1B showing the braking mechanism.
Figure 3B:
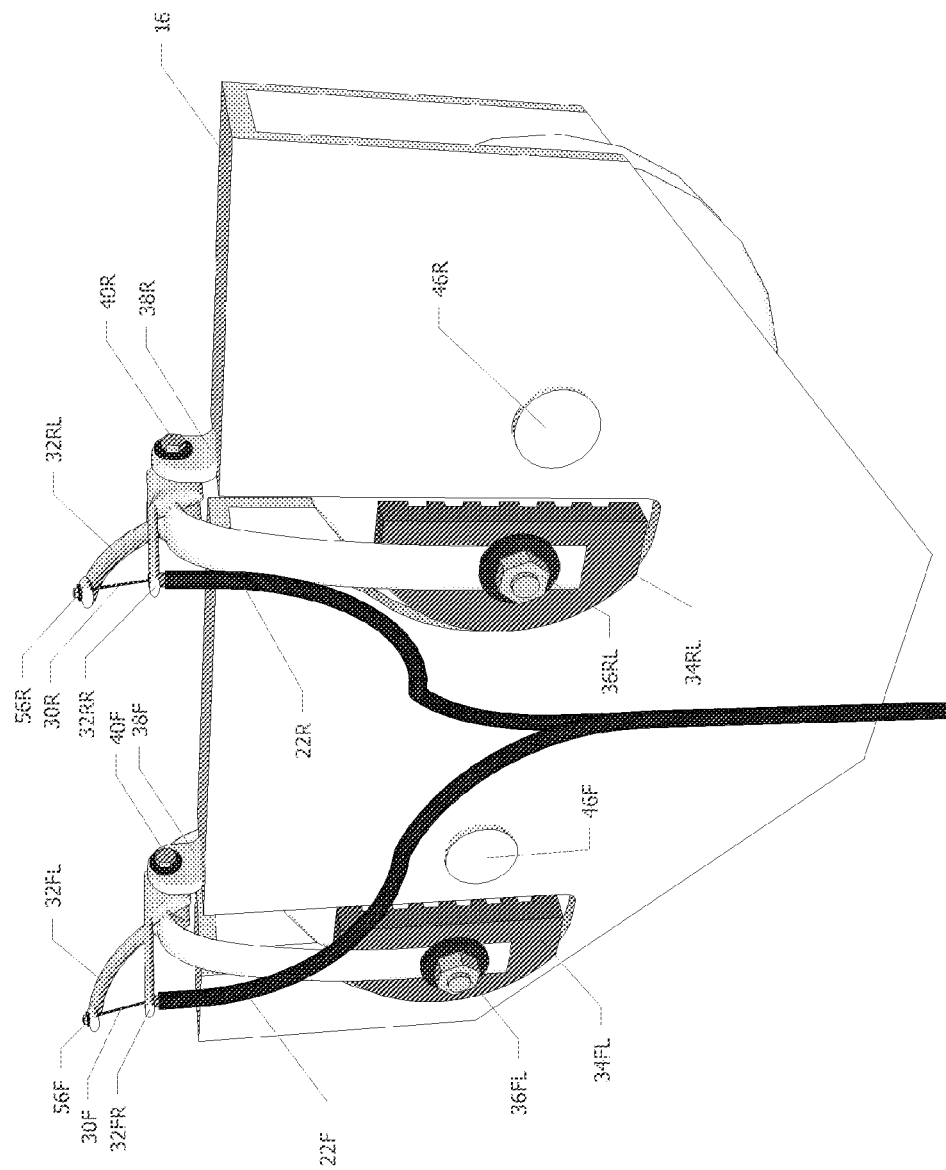
FIG. 3B is a left-side, rear-angle, close-up view of the pulley housing of FIG. 1B showing the braking mechanism.

Referring to FIGS. 3A and 3B, front and rear pulley pins 46F and 46R are seen to extrude through pulley housing 16. Front left caliper 32FL and front right caliper 32FR are secured to front brake mounting bracket 38F via front brake bolt 40F. Front brake bolt nut 42F is affixed to front brake bolt 40F and used to secure front left and right calipers 32FL and 32FR to front brake mounting bracket 38F. A front left brake pad 34FL is secured to front left caliper 32FL via a front left brake pad nut 36FL. Rear right caliper 32RR and rear left caliper 32RL are secured to rear brake mounting bracket 38R via rear brake bolt 40R. Rear brake bolt nut 42R is affixed to rear brake bolt 40R and used to secure rear left and right calipers 32RL and 32RR to rear brake mounting bracket 38R. A rear left brake pad 34RL is secured to rear left caliper 32RL via a rear left brake pad nut 36RL. The top of a front brake cable sleeve 22F connects to front right caliper 32FR. Housed within front brake cable sleeve 22F and allowed to slide freely is a front brake cable 30F. A front brake cable nut 56F is used to affix front brake cable 30F to front left caliper 32FL. The top of a rear brake cable sleeve 22R connects to rear right caliper 32RR. Housed within rear brake cable sleeve 22R and allowed to slide freely is a rear brake cable 30R. A rear brake cable nut 56R is used to affix rear brake cable 30R to rear left caliper 32RL.

In the preferred embodiment, front left brake pad nut 36FL, rear left brake pad nut 36RL, front brake cable 30F, rear brake cable 30R, front brake cable nut 56F and rear brake cable nut 56R are constructed of steel. However, any or all of these items can also be constructed of titanium, aluminum or any other rigid material adequate for safe operation. Front left brake pad 34FL and rear left brake pad 34RL are constructed of a durable polymeric material, such as Teflon, nylon, high-density polyethylene (HDPE) or any other conventional brake material adequate for safe operation. Front brake cable sleeve 22F and rear brake cable sleeve 22R are of adequate size and constructed of material for safe operation. Precise assembly of the components in FIGS. 3A and 3B is more clearly illustrated in the exploded views of FIGS. 6A and 6B.

Figure 4A:
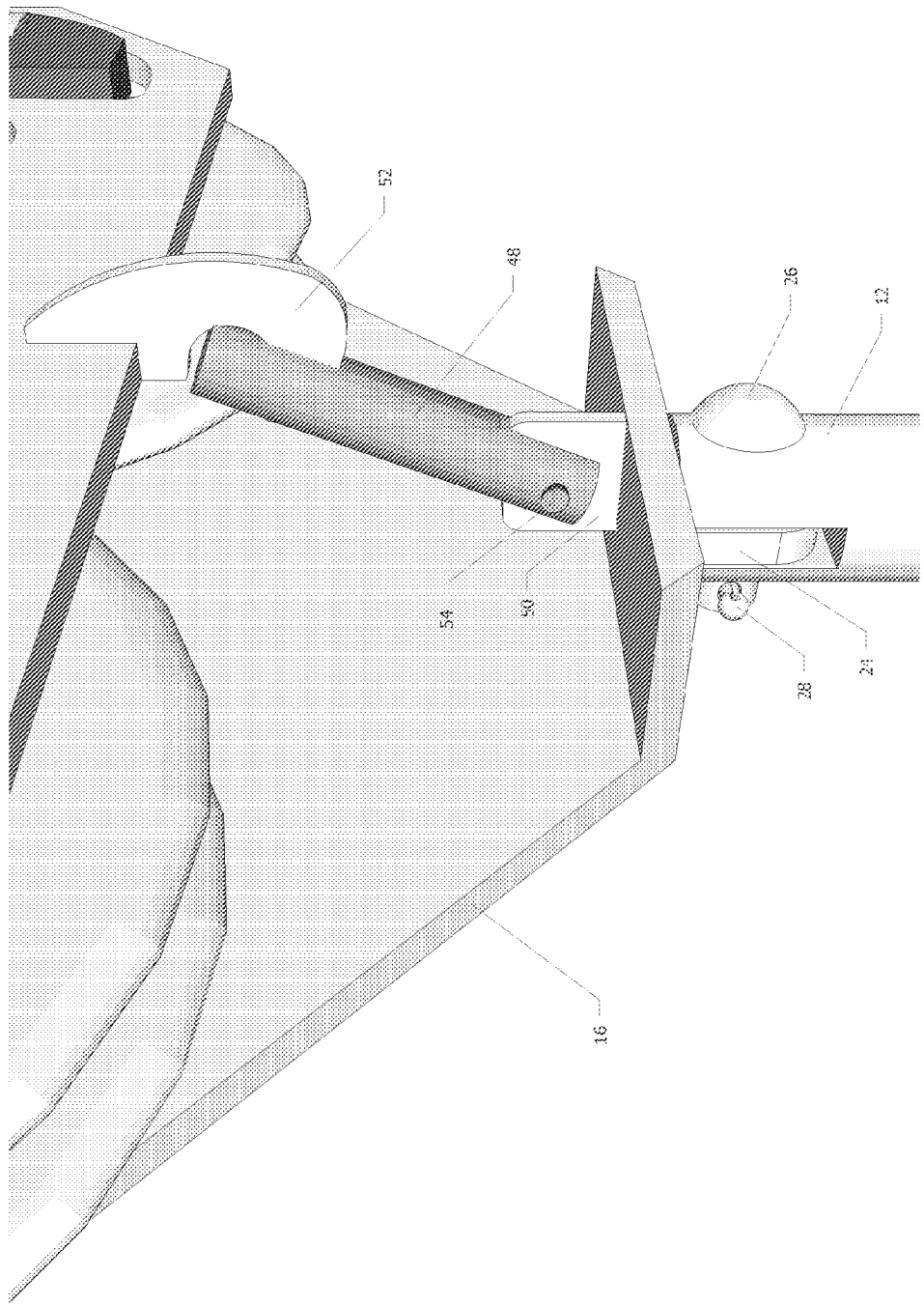
FIG. 4A is a right-side, rear-angle, close-up view showing the latching mechanism of FIG. 1A in the closed position and vertical shaft connection to the pulley housing.
Figure 4B:
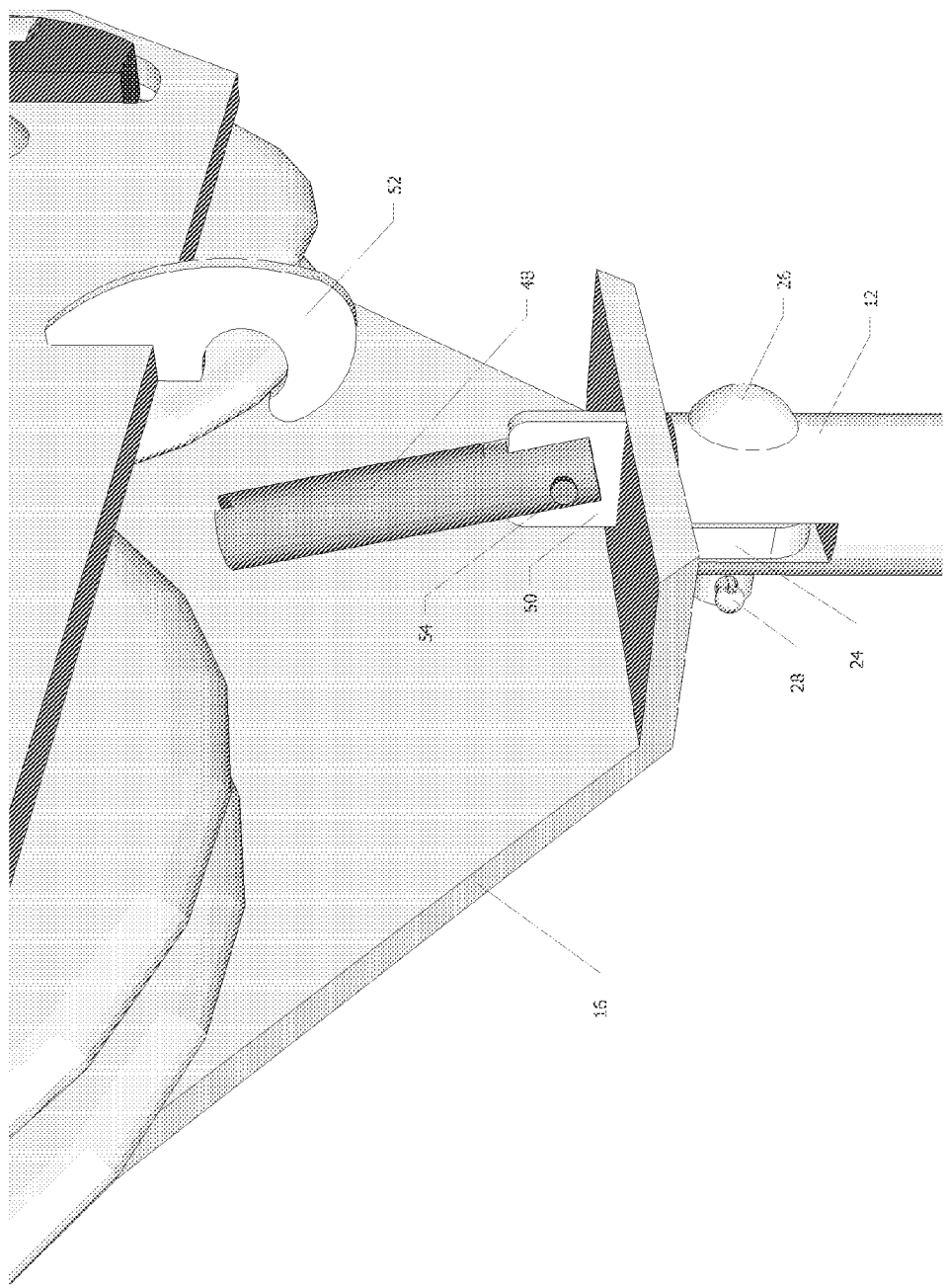
FIG. 4B is a right-side, rear-angle, close-up view showing the latching mechanism of FIG. 1A in the open position and vertical shaft connection to the pulley housing.

Referring to FIGS. 4A and 4B, a latch assembly and the manner in which vertical shaft 12 affixes to pulley housing 16 are illustrated. A latch shaft mounting bracket 50 and a latch shaft seat 52 are rigidly affixed to pulley housing 16. The bottom side of a latch shaft 48 is mounted to latch shaft mounting bracket 50 via a latch shaft hinge 54. FIG. 4A illustrates latch shaft 48 in the closed position with the top of latch shaft 48 securely seated in latch shaft seat 52. FIG. 4B illustrates latch shaft 48 in the open position such that the rider controlled zip line trolley brake can be placed on top of suspended cable 8. A vertical shaft mounting bracket 24 is rigidly affixed to the bottom of pulley housing 16. Vertical shaft 12 is connected to vertical shaft mounting bracket 24 via a vertical shaft mounting pin 26. A vertical shaft cotter pin 28 is inserted into vertical shaft mounting pin 26 to secure vertical shaft 12 and vertical shaft mounting pin 26 to vertical shaft mounting bracket 24.

In the preferred embodiment, latch shaft mounting bracket 50, latch shaft seat 52 and vertical shaft mounting bracket 24 are constructed of the same material chosen for pulley housing 16. Latch shaft 48, latch shaft hinge 54, vertical shaft mounting pin 26 and vertical shaft cotter pin 28 are constructed of steel, titanium, aluminum or any other rigid material adequate for safe operation. Precise assembly of the components in FIGS. 4A and 4B is more clearly illustrated in the exploded views of FIGS. 6A and 6B.

Referring to FIG. 5, it can be seen that left and right horizontal handles 10L and 10R are connected to the bottom portion of vertical shaft 12. Harness loop 14 connects to the bottom of vertical shaft 12. Front hand brake mounting bracket 18F is affixed to right horizontal handle 10R and rear hand brake mounting bracket 18R is affixed to left horizontal handle 10L. Front hand brake lever 20F connects to front hand brake mounting bracket 18F and rear hand brake lever 20R connects to rear hand brake mounting bracket 18R. Front brake cable sleeve 22F connects to front hand brake mounting bracket 18F and rear brake cable sleeve 22R connects to rear hand brake mounting bracket 18R.

Figure 6A:
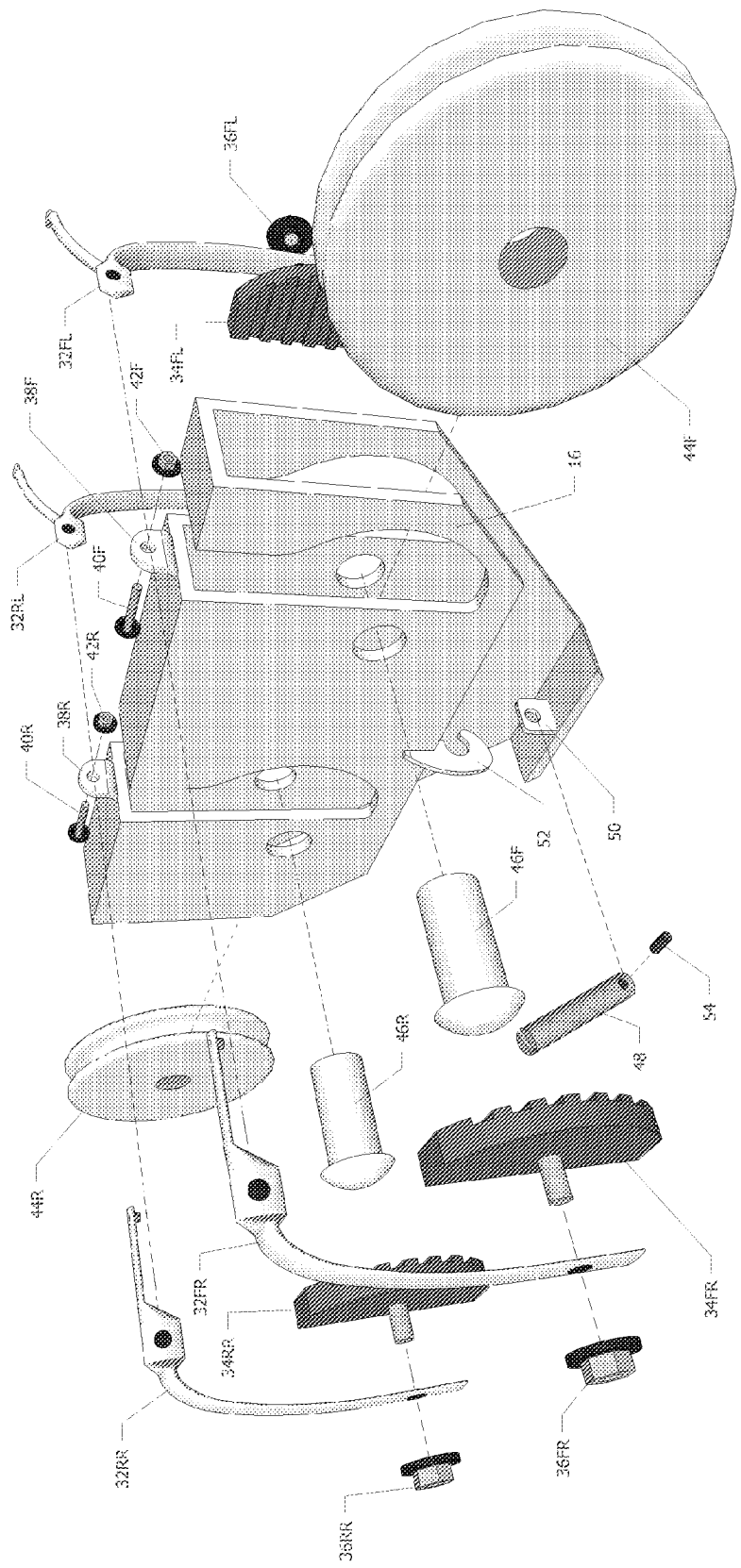
FIG. 6A is a right-side, front-angle, exploded view of the pulley housing of FIG. 1A showing the assembly of all pieces.
Figure 6B:
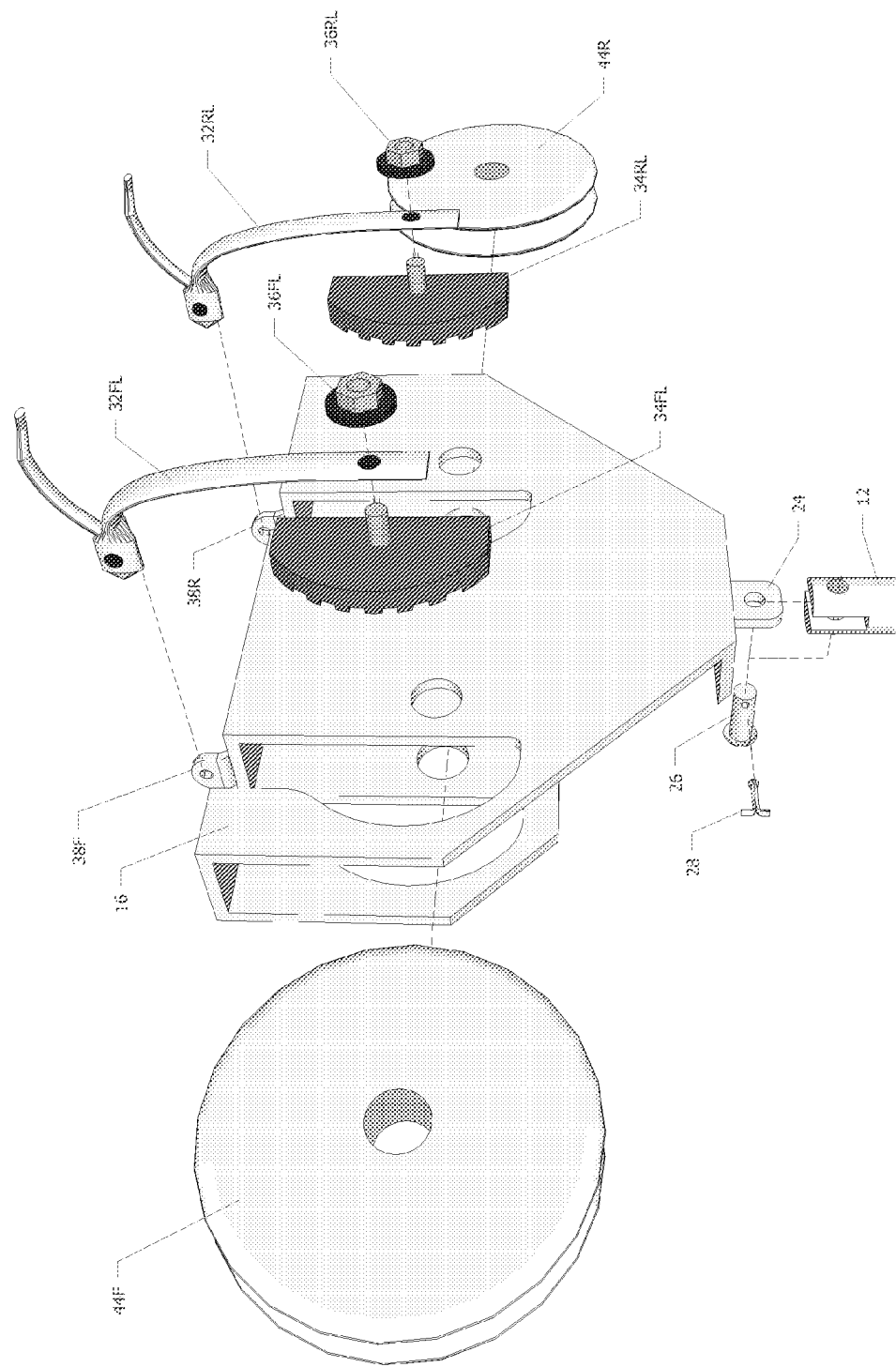
FIG. 6B is a left-side, front-angle, exploded view of the pulley housing of FIG. 1B showing the assembly of all pieces.

Referring to the exploded views of FIGS. 6A and 6B, each component can be seen along with its method of assembly. Front and rear pulleys 44F and 44R enter pulley housing 16 from the ends and are affixed with front and rear pulley pins 46F and 46R. Latch shaft mounting bracket 50 and latch shaft seat 52 are rigidly affixed to pulley housing 16. Latch shaft 48 connects to latch shaft mounting bracket 50 via latch shaft hinge 54. Front right brake pad 34FR connects to front right caliper 32FR and is secured with front right brake pad nut 36FR. Front left brake pad 34FL connects to front left caliper 32FL and is secured with front left brake pad nut 36FL. Front right caliper 32FR and front left caliper 32FL are connected to front brake mounting bracket 38F and are fastened with front brake bolt 40F and front brake bolt nut 42F. Rear right brake pad 34RR connects to rear right caliper 32RR and is secured with rear right brake pad nut 36RR. Rear left brake pad 34RL connects to rear left caliper 32RL and is secured with rear left brake pad nut 36RL. Rear right caliper 32RR and rear left caliper 32RL are connected to rear brake mounting bracket 38R and are fastened with rear brake bolt 40R and rear brake bolt nut 42R. Vertical shaft mounting bracket 24 is rigidly affixed to the bottom of pulley housing 16. Vertical shaft 12 surrounds vertical shaft mounting bracket 24. Vertical shaft mounting pin 26 slides through both vertical shaft 12 and vertical shaft mounting bracket 24. Vertical shaft cotter pin 28 slides through vertical shaft mounting pin 26 such to prevent vertical shaft mounting pin 26 from slipping out of vertical shaft 12 and vertical shaft mounting bracket 24.

OPERATION

FIGS. 1A, 1B, 2A, 2B, 3A, 3B, 4A, 4B

The manner of using the rider controlled zip line trolley brake is similar to other zip line trolleys. To begin, a rider (not shown) is fitted with a conventional harness or similar safety device (not shown). The rider and safety harness are then securely connected to harness loop 14 with a conventional quick link, carabiner or other safety latching mechanism (not shown). In normal operation, latch shaft 48 remains in the closed position as seen in FIG. 4A. To utilize the rider controlled zip line trolley brake, the rider opens latch shaft 48 as seen in FIG. 4B. The rider then maneuvers the rider controlled zip line trolley brake around the beginning-end of suspended cable 8 and rests front and rear pulleys 44F and 44R on top of suspended cable 8 as seen in FIGS. 1A and 1B. The rider then returns latch shaft 48 to the closed position as seen in FIG. 4A. With the rider safely secured to harness loop 14 and the rider controlled zip line trolley brake affixed to suspended cable 8, the rider holds on with both hands to left and right horizontal handles 10L and 10R. The rider then engages in a ride embarking at a downward descent along suspended cable 8. As the rider's speed increases while traversing along suspended cable 8, the rider may choose to begin slowing his or her velocity. To accomplish this, the rider will create a constricting force by squeezing front and rear hand brake levers 20F and 20R seen in FIGS. 1A and 1B. Hand brake levers 20F and 20R have a continuous range of motion bound by first and last positions. The first position, or open position, correlates to a minimum constricting force. The last position, or ultimate position, correlates to a maximum constricting force. This constricting force applied to front and rear hand brake levers 20F and 20R results in a tension being applied to front and rear brake cables 30F and 30R seen in FIGS. 3A and 3B. This tension will cause front and rear brake cables 30F and 30R to slide within front and rear brake cable sleeves 22F and 22R, thus resulting in another constricting force which is applied to front left and right calipers 32FL and 32FR as well as rear left and right calipers 32RL and 32RR seen in FIGS. 2A, 2B, 3A and 3B. As front left and right calipers 32FL and 32FR and rear left and right calipers 32RL and 32RR constrict, front left and right brake pads 34FL and 34FR and rear left and right brake pads 34RL and 34RR will apply a dynamic frictional force directly to front and rear pulleys 44F and 44R. This frictional force will cause the rider's speed of descent along suspended cable 8 to decrease. A greater constricting force applied by the rider to front and rear hand brake levers 20F and 20R will result in a greater dynamic frictional force being applied to front and rear pulleys 44F and 44R via front left and right brake pads 34FL and 34FR and rear left and right brake pads 34RL and 34RR. This greater constricting force will slow the rider's speed of descent at a quicker rate. Upon reaching the ending-end of suspended cable 8 and coming to a safely stopped position, the rider will release front and rear hand brake levers 20F and 20R. As a result of the constricting force being removed from front and rear hand brake levers 20F and 20R, the tension in front and rear brake cables 30F and 30R is also removed. Therefore, front left and right calipers 32FL and 32FR as well as rear left and right calipers 32RL and 32RR no longer constrict around front and rear pulleys 44F and 44R. Thus, the friction applied to front and rear pulleys 44F and 44R is removed. The rider can then open latch shaft 48 as seen in FIG. 4B and remove the rider controlled zip line trolley brake from suspended cable 8.

ADVANTAGES

Several advantages of some embodiments of this rider controlled zip line trolley brake are seen to be:
a) Provide the rider with complete control of his or her speed of descent while traversing along a suspended cable. This will allow novices to slowly descend at a speed they are comfortable with, while also allowing daredevils to descend as rapidly as a particular zip line will allow.
b) Allows riders of any weight and thrill-seeking range, either novices or daredevils, to stop at a precise location every time, regardless if it is upon a mounted platform or small ladder.
c) Utilizes a common handbrake, similar to that of a bicycle which is easy for the rider to apply and release.
d) Focuses all dynamic frictional braking forces onto the pulleys and not onto the suspended cable, thus enhancing safety and minimizing damage to the structural integrity of the suspended cable.
e) Can be used on a common zip line system including those with only a single suspended cable.
f) Allows the rider to quickly and easily remove the trolley from the suspended cable at the end of the ride and easily transport it to another suspended cable.
g) The brake pads, which are expressly designed to wear with use, are simple to replace.
h) Allows for utilization of the entire length of a suspended cable, unlike the typical 70.0%-80.0% of length typically utilized with a gravity braking or impact braking method.
i) Prevents the "whip-lash effect" witnessed with a common impact braking method.
j) Allows zip line course designers and constructors the freedom to adjust the angle of descent of suspended cables such to maximize the enjoyment experienced from increasing speed.
k) Additional personnel are not required to facilitate braking.
l) Can easily and safely be used on different suspended cables, each having different diameters. This braking mechanism is completely independent of the diameters among different suspended cables.
m) The rigid handle prevents the twisting effect of the rider commonly experienced with traditional trolleys and harnessing systems. Thus, the rider can consistently approach the ending-end with both feet in a safe position.

CONCLUSION, RAMIFICATIONS AND SCOPE

Accordingly, the reader will see that at least one embodiment of this rider controlled zip line trolley brake provides a more practical means of bringing a zip line rider to a safe stop. Zip lines are enjoyed worldwide and are employed by many thrill-ride, amusement and challenge courses along with individuals at their own private course or residence. Although relatively simple and straightforward systems, common zip lines can be extremely dangerous if not designed and constructed properly.

While designing and constructing a common zip line, designers must allow for a means to bring the rider to a safe stop. Prior art braking methods have a host of problems in that they are unsafe, unreliable, unpredictable or not economical to be applied to a common zip line. They either risk injuring the rider with an abrupt impact or other unsafe stopping method, jeopardize the structural integrity of the suspended cable, are not transportable among multiple suspended cables in a practical and quick manner, leave the rider no control of his or her speed of descent, or require so many parts and pieces to construct that it becomes cost prohibitive to be applied to a common zip line.

This rider controlled zip line trolley brake is simple to apply to any common zip line. Any rider, regardless of weight or skill level, can safely and comfortably enjoy the thrill of a common zip line with this trolley. Riders have complete control of their deceleration rate. Furthermore, riders can consistently stop at an exact location anywhere along the suspended cable, thus allowing for a safe ride and stop. Complex factors such as rider-weight variations, pulley mechanisms and additional personnel are not necessary for this rider controlled zip line trolley brake to perform as desired. It is designed such that the parts intended to wear-out are simple and quick to replace. Dynamic frictional forces which can jeopardize the structural integrity of a suspended cable are kept to an absolute minimum, thus prolonging its life expectancy and degree of safety.

This rider controlled zip line trolley brake allows common zip line course designers the maximum amount of flexibility in utilizing the available landscape to design a zip line course. In addition to design flexibility, the ease of portability among suspended cables for this trolley further simplifies course design and reduces construction costs. The implementation of a common hand brake as the means for applying the braking mechanism further makes this trolley easy and comfortable to use for any rider. Riders can enjoy a ride for the total length of the suspended cable and can also stop at a precise location of their preference. Stopping is independent of factors such as velocity, which are predicated by weight and angle of descent of the suspended cable. The rigidly mounted vertical shaft and handles allow riders to maintain their feet in a forward position during the entire duration of their ride. This prevents the unsafe twisting effect so commonly experienced with conventional trolleys and harnesses.

While the above description contains many specificities, these should not be construed as limitation on the scope, but rather as an exemplification of one preferred embodiment thereof. Many other variations are possible. For example, the above description details two sets of handbrakes and associated calipers and brake pads. However, adequate braking could be achieved with only one handbrake and one pair of calipers and brake pads. Furthermore, the brake pads could be re-oriented in such a fashion as to create friction along the top of the pulleys rather than on the sides. Finally, a similar result could be achieved with the use of either a single pulley or even more than two as detailed. Accordingly, the scope should be determined not by the embodiments illustrated, but by the appended claims and their legal equivalents.

I claim:

1. A trolley adapted to support and allow a harnessed rider to travel along a suspended cable, said suspended cable oriented along a longitudinal central axis, said trolley comprising:
   (a) a pulley housing comprising a substantially flat metal support flange plate, wherein said substantially flat metal support flange plate is arranged in a C-shaped manner and wherein said pulley housing includes at least one cross-sectional opening and at least one complete opening,
   (b) a handle assembly comprising at least one horizontal handle connected in a perpendicular orientation to a vertical shaft, said handle assembly pivotably mounted to said pulley housing in a downward orientation perpendicular to the central axis,
   (c) at least one pulley being mounted within said pulley housing with at least one pulley pin and said at least one pulley rotating freely within said pulley housing and aligned with said at least one cross-sectional opening, said at least one pulley having a circumferential groove that rides along the upper surface of said suspended cable and an axis of rotation that is generally horizontal and perpendicular to the central axis,
   (d) a latch assembly comprising a latch shaft, a latch shaft mounting bracket and a latch shaft seat, said latch assembly oriented and positioned such to cover said at least one complete opening and allowing for mounting and securing said trolley to said suspended cable, wherein said latch shaft is depressed such to open said at least one complete opening and permit entry of said suspended cable into said pulley housing such that said circumferential groove of said at least one pulley is placed on top of said suspended cable and wherein said latch shaft is closed thereby closing said at least one complete opening and securing said trolley to said suspended cable,
   (e) a brake assembly positioned to convert a constricting force into a dynamic frictional force, which when activated, brakes said trolley relative to said suspended cable on which said trolley is traveling, said brake assembly comprising at least one brake pad positioned within said at least one cross-sectional opening and positioned such to contact said at least one pulley, said at least one brake pad rigidly affixed to at least one caliper which is pivotably attached to said pulley housing, at least one hand brake lever rigidly affixed to said at least one horizontal handle, at least one brake cable affixed to said at least one hand brake lever at one end and another end affixed to said at least one caliper,
   whereby said trolley will travel along said suspended cable and said dynamic frictional force can be applied to said at least one pulley via said at least one brake pad in response to said constricting force applied by said rider to said at least one hand brake.

2. The trolley of claim 1 wherein said pulley housing and said at least one pulley are of predetermined size and shape and fabricated from rigid material adequate for safe operation.

3. The trolley of claim 1 wherein said at least one brake pad is constructed from a durable abrasion resistant material selected from the group consisting of Teflon, nylon, high-density polyethelene, and composites.

4. The trolley of claim 1 wherein said trolley is a system for controlling the speed of a rider traveling along a suspended cable, whereby said rider applies said constricting force to said at least one hand brake whereby said dynamic frictional force is created between said at least one brake pad and said at least one pulley, whereby said rider's velocity will decrease in response to said dynamic frictional force.

* * * * *